United States Patent [19]
Haughton et al.

[11] Patent Number: 5,274,703
[45] Date of Patent: Dec. 28, 1993

[54] AUTOMATIC LOSS CONTROL CIRCUIT

[75] Inventors: Lance J. Haughton, East Orange; Inchol Yon, Little Ferry, both of N.J.

[73] Assignee: AT&T Bell Laboratories, Murray Hill, N.J.

[21] Appl. No.: 704,501

[22] Filed: May 23, 1991

[51] Int. Cl.[5] .................... H04M 1/00; H04M 7/04
[52] U.S. Cl. .................... 379/401; 379/400; 379/398
[58] Field of Search ............ 379/401, 400, 399, 398

[56] References Cited

U.S. PATENT DOCUMENTS

| | | | |
|---|---|---|---|
| 3,881,066 | 4/1975 | Macrander et al. | 379/400 |
| 4,056,688 | 11/1977 | Stiefel | 379/398 |
| 4,320,257 | 3/1982 | Warman | 379/400 |
| 4,343,971 | 8/1982 | Beene . | |
| 4,588,856 | 5/1986 | Cohen | 379/398 |
| 4,607,247 | 8/1986 | Sterling, Jr. et al. . | |
| 4,727,578 | 2/1988 | Molnar | 379/400 |
| 4,779,074 | 10/1988 | Whitford et al. . | |
| 4,791,668 | 12/1988 | Pringle | 379/398 |

FOREIGN PATENT DOCUMENTS 1584778 2/1981 United Kingdom ............... 379/398

OTHER PUBLICATIONS

British Telecom Specification, pp. 0601-0605 and FIG. 10, Issue 1, Jan. 1985.
R-TEC Systems, RPI Section 18, Issue 1, Nov. 1987, "RT Plug-In Dual Super POTS With Automatic Trunk Loss Control Channel Unit."

Primary Examiner—James L. Dwyer
Assistant Examiner—Jack Chiang
Attorney, Agent, or Firm—Lester H. Birnbaum

[57] ABSTRACT

A circuit is proposed for adjusting the loss provided to loops in digital loop carrier transmission systems. A constant current is supplied to the loop and the resulting voltage is measured to determine the resistance of the loop. This value is fed to a microprocessor with a look-up table which controls a programmable analog/digital converter. The loss at the output of the converter is a stepwise function based on the resistance of the customer loop.

12 Claims, 2 Drawing Sheets

AUTOMATIC LOSS CONTROL CIRCUIT

BACKGROUND OF THE INVENTION

This invention relates to digital loop carrier transmission systems.

In a typical digital loop transmission system, such as subscriber loop carrier (SLC ®) systems, digital transmission takes place between a central office and a remote terminal. Customer lines or loops are coupled to the remote terminal where analog to digital conversion takes place. One of the problems in such systems is that the length of a customer loop from the remote terminal, the cable type, and, therefore, the electrical resistance of the loop, varies widely. Thus, in cases where the loop is short, the volume of the voice signal may be uncomfortably high.

The need has been recognized to adjust the signal loss or gain in both analog and digital systems based on the resistance of the loop. (See, e.g., U.S. Pat. No. 4,056,688 issued to Stiefel and "RT Plug-In Dual Super POTS With Automatic Trunk Loss Control Channel Unit," *R-TEC Systems*, RPI Section 18, Issue Nov. 1, 1987.) In digital loop transmission in particular, it has been proposed to provide a loss curve which is a continuous function of the loop resistance (see *R-TEC Systems*, supra).

SUMMARY OF THE INVENTION

The invention is a circuit for automatic adjustment of loss in the loops of a digital loop carrier transmission system. The circuit includes means for providing a constant current to the loops and means for detecting the resulting dc voltage on the loops. A microprocessor is coupled to the detecting means and includes a look-up table for determining the amount of loss to be applied to the loops as a function of the resistance of the loops. A programmable analog/digital converter has an input coupled to the microprocessor look-up table and an output providing an analog signal to the loops. The signal is adjusted in accordance with the microprocessor output.

BRIEF DESCRIPTION OF THE DRAWING

These and other features are delineated in detail in the following description. In the drawing.

It will be appreciated that, for purposes of illustration, these figures are not necessarily drawn to scale.

DETAILED DESCRIPTION

Figure 1:
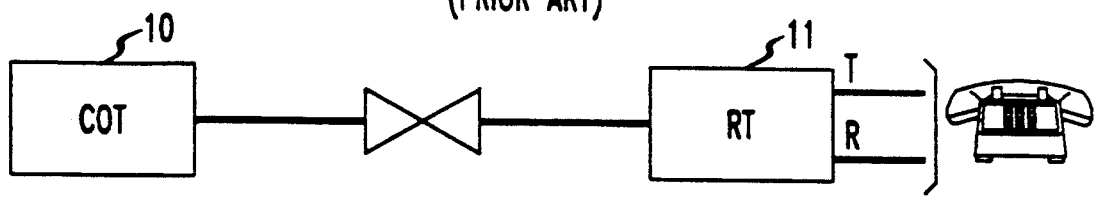
FIG. 1 is a block diagram illustrating a basic digital loop carrier transmission system in accordance with the prior art.

FIG. 1 illustrates a typical digital transmission system. Digital signals are transmitted over a bidirectional link between a central office terminal, 10, and a remote terminal 11. Customers are coupled to the system at the remote terminal through pairs of copper wires designated Tip (T) and Ring (R), also referred to as the customer loop. As discussed previously, the customers will be located at various distances from the remote terminal so that the length of the loops, and, therefore, the resistance of the loops, will vary. Also, the type of cable being used varies the loop resistance. Thus, when a call is initiated, it is desirable for the system to determine the loop resistance and adjust the loss (or gain) of the analog voice signals to the customer accordingly.

Figure 2:
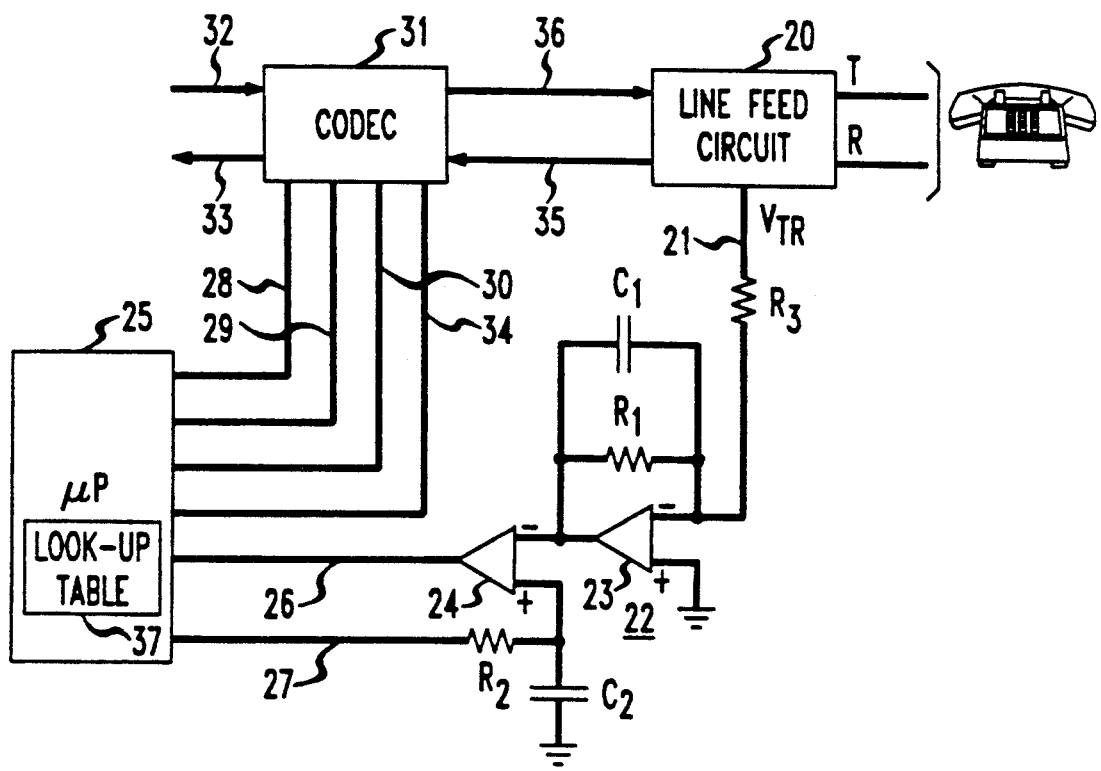
FIG. 2 is a block diagram illustrating components of a circuit in accordance with an embodiment of the invention.

FIG. 2 illustrates, in a block diagram, a circuit at the remote terminal which will automatically adjust the loss or gain of the signals in accordance with an embodiment of the invention. The Tip (T) and Ring (R) conductors of each customer are coupled to a line feed circuit 20. A function of the line feed circuit is to provide a constant current to the loop upon call initiation and then to determine the resulting dc voltage across Tip and Ring. The determination of the voltage provides a measurement of the total resistance of the loop according to Ohm's law. The typical current supplied is approximately 30 mA.

A scaled version, $V_{TR}$, of the resulting dc voltage across Tip and Ring appears at an output conductor, 21, of the line feed circuit. This converter is coupled through a resistor $R_3$ to the negative input of an amplifier 23 whose positive input is grounded. The amplifier feedback loop comprises a resistor $R_1$ and capacitor $C_1$ in parallel. The combination of amplifier 23, resistors $R_1$ and $R_3$, and capacitor $C_1$ comprises a filter 22 which serves to filter out any ac signal induced onto the incoming signal from adjacent power lines.

The output of filter 22 is coupled to the negative input of a comparator 24 whose positive input is coupled to ground through a capacitor $C_2$. The output of the comparator 24 is coupled to an input of a standard microprocessor, 25, by means of conductor 26. An output of the microprocessor is also coupled via conductor 27 through resistor $R_2$ to one plate of capacitor $C_2$.

Further outputs of the microprocessor are provided on conductors 28, 29, 30 and 34 to an analog/digital converter (Codec) with programmable gain. Typically, conductor 28 could serve as a chip select lead since there may be more than one Codec in each circuit. Conductor 29 can be a clock lead, while conductors 30 and 34 constitute the data input and output leads, respectively. The Codec also has coupled thereto a conductor 35 which transmits analog signals thereto from the line feed circuit, and a conductor 33 which transmits digital signals to other equipment at the remote terminal. Conductor 32 transmits digital signals to the Codec from other equipment and conductor 36 transmits analog signals to the feed circuit.

In operation, when a call is initiated on the loop, the filtered dc feedback voltage $V_{TR}$, as previously described, appears at the negative input of comparator 24 and causes the output on conductor 26 to be a logical low state. The microprocessor then charges up capacitor $C_2$ to produce a voltage at the positive input of comparator 24. The comparator output will remain low until the voltage at the positive input becomes greater than the voltage at the negative input, at which time the output becomes a logical high state. The microprocessor is thereby able to detect the voltage at the input of comparator 24 and, therefore, the resistance on the loop.

Preferably, the capacitor $C_2$ is initially charged up to a predetermined value by a constant voltage signal from the microprocessor, and then a train of pulsed signal is applied by the microprocessor. This insures that slight errors in the value of capacitor $C_2$ will not affect detection since the voltage provided to the capacitor will be a function of the on/off ratio of the train of pulses and independent of the value of the capacitance. If the output of comparator 24 does not change at this point, the constant and pulsed charging cycles are repeated until a low-high transition of comparator 24 has occurred.

Figure 3:
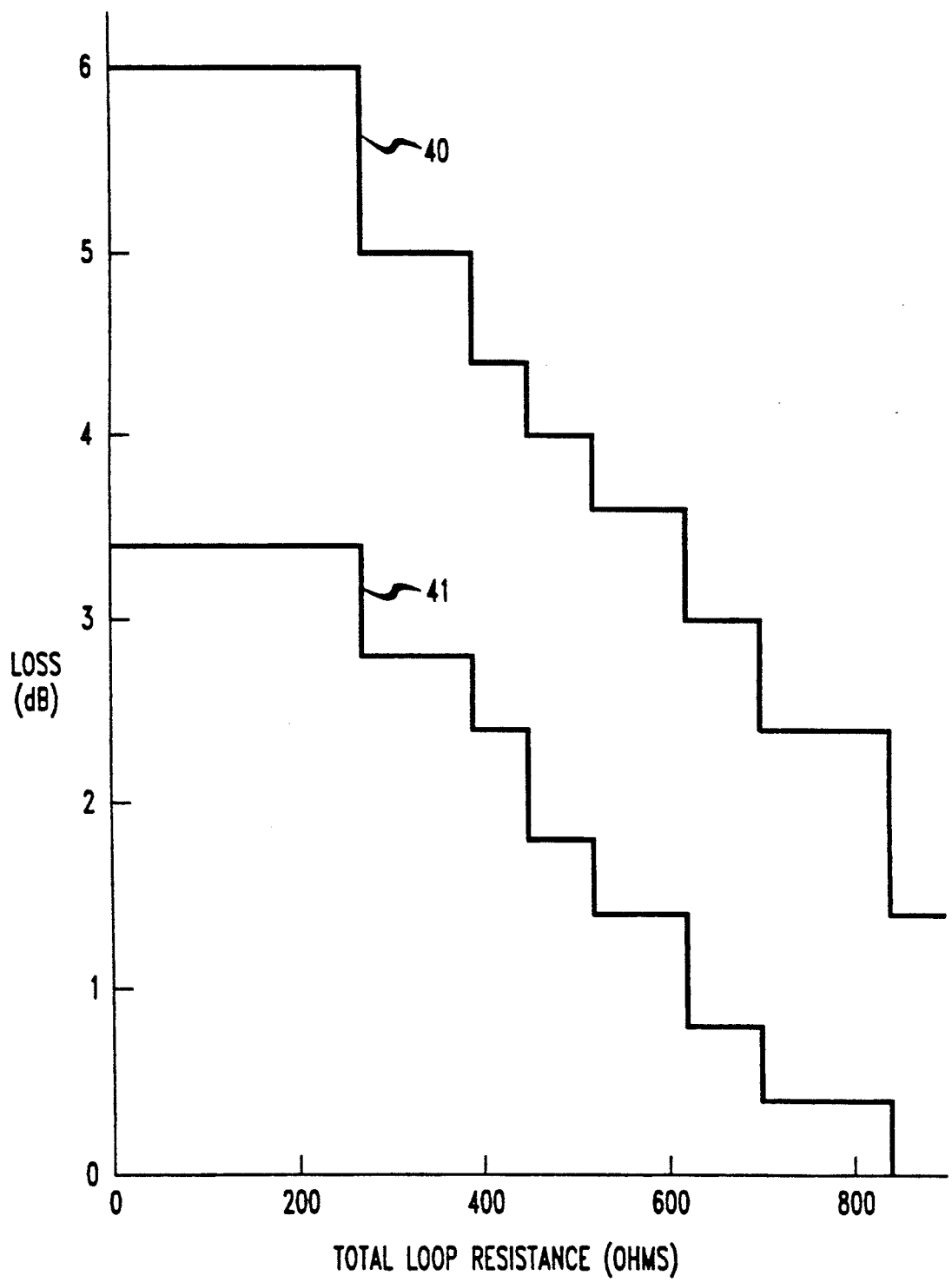
FIG. 3 is a graph of loss supplied to the loops of a digital loop carrier transmission system as a function of loop resistance in accordance with the same embodiment.

The microprocessor, 25, has a look-up table 37 for determining how much loss should be applied to the voice signal to the customer on the basis of the loop resistance. This table is illustrated in graph form in FIG. 3. Two curves are shown. Curve 40 is the loss profile which is applicable when the customer loop is a Plain Old Telephone Service (POTS), while curve 41 applies to a Super POTS Service (SPOTS). It will be noted that each curve is a step function where constant values of loss are applied at discrete intervals of loop resistances. The intervals of the two curves are equal, but the magnitude of loss applied differs. The maximum loss applied to a POTS line is 6 dB and the maximum loss applied to a SPOTS line is 3.40 db up to a loop resistance of 270 ohms. The minimum loss applied to the POTS line is 1.40 dB for loop resistances of 840 ohms or greater, while the loss applied to the SPOTS line for such resistances will be zero.

On the basis of the look-up table, the microprocessor 25 generates a signal on line 30 coupled to programmable Codec 31. The Codec changes the digital signal from line 32 into the analog voice signal on line 36 and the analog signal from line 35 into the digital signal on line 33. The microprocessor signal, therefore, adjusts the gain provided by the converter so that the appropriate loss is supplied in both directions.

Various modifications of the invention will become apparent to those skilled in the art. All such variations which basically rely on the teachings through which the invention has advanced the art are properly considered within the scope of the invention.

We claim:

1. A circuit for automatic adjustment of signal loss in loops of a digital loop transmission system comprising:
   means for providing a constant current to the loops;
   means for detecting a resulting dc voltage on the loops comprising a comparator with one input coupled to a capacitor and another input coupled to the means for providing a constant current;
   a microprocessor coupled to said detecting means, said microprocessor including a look-up table for determining an amount of loss to be applied to the loops as a function of a resistance of the loops and said microprocessor being adapted to charge the capacitor; and
   a programmable analog/digital converter having an input coupled to a microprocessor look-up table output and an output providing an analog signal to the loops, the analog signal being adjusted in accordance with the microprocessor output.

2. The circuit according to claim 1 wherein an amount of loss as a function of loop resistance is a stepwise function.

3. The circuit according to claim 1 wherein the means for providing a constant current comprises a line feed circuit.

4. The circuit according to claim 1 wherein the microprocessor is adapted to charge the capacitor by a combination of a constant voltage signal and a pulsed signal.

5. The circuit according to claim 1 further comprising a filter coupled between said another input of the comparator and the means for providing the constant current to the loops.

6. The circuit according to claim 2 wherein a maximum loss provided to the analog signal is −6 dB.

7. The circuit according to claim 6 wherein a maximum loss is applied for a loop resistance in a range 0-270 ohms.

8. A method of automatically adjusting signal loss on loops of a digital loop transmission system comprising the steps of:
   applying a constant current to the loops;
   detecting a resulting dc voltage on the loops by having a microprocessor charge a capacitor which is coupled to an input of a comparator with another input of the comparator coupled to means for applying said constant current;
   applying the resulting dc voltage to the microprocessor which includes a look-up table for determining an amount of loss to be applied to the loops as a function of a resistance of the loops; and
   applying a signal from an output of the microprocessor look-up table to a programmable analog/digital converter which has an output supplying an analog signal to the loops, such that the analog signal is adjusted in accordance with the microprocessor output.

9. The method according to claim 8 wherein an amount of loss supplied to the loops as a function of loop resistance is a stepwise function.

10. The method according to claim 8 wherein a loss supplied is a maximum of −6 dB.

11. The method according to claim 10 wherein a maximum loss is applied for a loop resistance in a range 0-270 ohms.

12. The method according to claim 8 wherein the capacitor is charged by a combination of a constant voltage and a train of pulsed signals from the microprocessor.

* * * * *